United States Patent [19]

Boward, Jr. et al.

[11] 4,431,618

[45] Feb. 14, 1984

[54] PROCESS CONTROL OF CONTINUOUS SODIUM-LIMESTONE FLUE GAS DESULFURIZATION SYSTEM

[75] Inventors: Willard L. Boward, Jr., Hoffman Estates; Kuei H. Wang, Arlington Heights, both of Ill.

[73] Assignee: FMC Corporation, Philadelphia, Pa.

[21] Appl. No.: 433,578

[22] Filed: Oct. 12, 1982

[51] Int. Cl.$^3$ .............................. C01B 17/00
[52] U.S. Cl. ................... 423/242; 422/62; 436/55; 436/163
[58] Field of Search ............ 423/242 A, 242 R, 243, 423/244 A, 244 R; 422/62; 436/55, 163

[56] References Cited

U.S. PATENT DOCUMENTS

| | | | |
|---|---|---|---|
| 3,409,409 | 11/1968 | Sackett | 423/163 |
| 3,761,570 | 9/1973 | Lowicki et al. | 423/225 |
| 3,767,765 | 10/1973 | Gustavsson et al. | 423/220 |
| 3,781,408 | 12/1973 | Lin | 423/244 |
| 3,897,540 | 7/1955 | Onnen | 436/55 |
| 3,911,084 | 10/1975 | Wall et al. | 423/242 |
| 3,919,394 | 11/1975 | Selmeczi | 423/242 |
| 3,980,756 | 9/1976 | Dixson et al. | 423/242 |
| 3,989,797 | 11/1976 | Brady et al. | 423/242 |
| 4,014,978 | 3/1977 | Klein | 423/242 |
| 4,080,428 | 3/1978 | Holter et al. | 423/242 |
| 4,151,255 | 4/1979 | Capuano et al. | 422/76 |
| 4,155,977 | 5/1979 | Baker | 422/62 |
| 4,239,493 | 12/1980 | Niemi et al. | 23/230 A |
| 4,322,224 | 3/1982 | Roth | 422/62 |

OTHER PUBLICATIONS

EPA-600/7-81-141b, J. A. Valencia et al., "Evaluation of the Limestone Dual Alkali Prototype System at Plant Scholz: Final Report," Aug. 1981.
J. C. S. Chang et al., "Pilot Testing of Limestone Regeneration in Dual Alkali Processes," EPA/EPRI Symposium on Flue Gas Desulfurization, Hollywood, Florida, May 18, 1982.

*Primary Examiner*—Gregory A. Heller
*Attorney, Agent, or Firm*—Christopher Egolf

[57] ABSTRACT

A method of controlling the continuous operation of the absorption and regeneration processes of a sodium-limestone double alkali flue gas desulfurization system, in which measurements of absorber effluent solution pH or flow diverted for regeneration are used as the primary control parameter governing the limestone addition rate.

8 Claims, 1 Drawing Figure

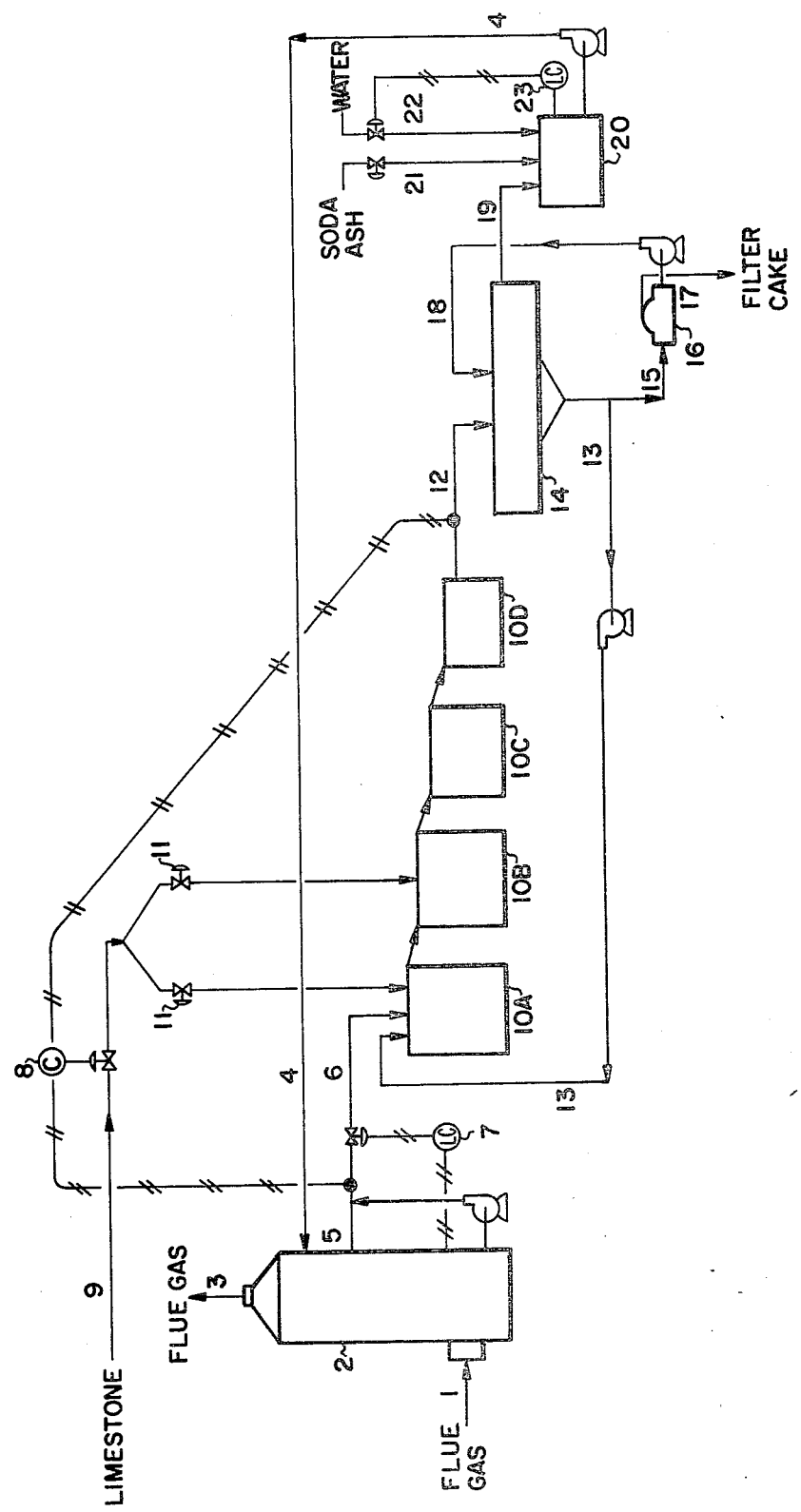

PROCESS CONTROL OF CONTINUOUS SODIUM-LIMESTONE FLUE GAS DESULFURIZATION SYSTEM

BACKGROUND OF THE INVENTION

This invention relates to the process control of a flue gas desulfurization system that utilizes a sodium sulfite- and sodium bisulfite-containing alkaline absorption solution regenerated with limestone.

Flue gas desulfurization processes that employ alkaline absorption solutions containing both sodium sulfite and sodium bisulfite for removing sulfur oxides like $SO_2$ from flue gases are well known and are normally operated continuously with the spent absorption solution being regenerated with lime or limestone. Such lime/limestone-sodium salt processes are often termed "double" or "dual" alkali processes in contradistinction to single alkali processes that directly treat the flue gas with lime or limestone.

Double alkali processes that utilize lime as the regenerating agent are in commercial use throughout the United States. U.S. Pat. No. 3,911,084 issued to Wall et al. discloses one such lime-sodium double alkali process.

Double alkali processes that utilize limestone, however, are not known to be in commercial use in the United States, despite the cost advantages of limestone over lime. This is apparently so because no efficient procedures, i.e., parameter ranges and process control techniques, have been devised for operating such processes competitively with lime-sodium double alkali processes.

Lime-sodium double alkali processes described in the patent literature often include the disclosure that limestone may be substituted as the regenerating agent for lime. Such a substitution, however, is not at all straightforward, particularly with respect to process control, since regeneration characteristics such as regenerating agent reaction rate and utilization efficiency, and solution pH values, are distinctly different for these two chemical regenerating agents.

In a lime-based regeneration system, lime addition is satisfactorily controlled via a feedback control signal from regeneration pH, to provide the desired stoichiometric quantity of lime for completely neutralizing the absorbed sulfur oxides. The regeneration pH is very responsive and sensitive to the lime addition rate, because of lime's high reactivity with bisulfite formed from absorbed $SO_2$, the short reactor residence times typically employed, and the very alkaline pH (usually in excess of 8.5) required for complete regeneration.

Unlike lime, limestone is characterized by low reactivity with bisulfite, requiring fairly long regeneration reactor residence times. This factor, along with the relatively low regeneration pH values employed in limestone regeneration and the highly buffered nature of a limestone-sodium absorber solution, preclude the use of regeneration pH as the primary parameter for satisfactorily controlling the limestone addition rate during regeneration.

Sodium-limestone double alkali systems that are described in the prior art, such as U.S. Pat. No. 3,848,070 issued to Onozuka et al., No. 3,944,649 issued to Field et al. and No. 3,989,796 issued to Morita et al., provide little information concerning effective and efficient process control of the absorption and regeneration processes.

The present invention provides a method for controlling the continuous operation of a sodium-limestone double alkali flue gas desulfurization system with superior efficiency in both the absorption and regeneration processes. The method is particularly suited for controlling the sodium-limestone double alkali flue gas desulfurization method described in co-pending application U.S. Ser. No. 376,879 filed May 10, 1982, whose disclosures are hereby incorporated by reference.

SUMMARY OF THE INVENTION

The present invention is applicable to a sodium-limestone double alkali system for the continuous desulfurization of flue gas, having the steps of absorbing sulfur dioxide from a $SO_2$-containing gas stream in an absorber with an aqueous solution of sodium sulfite and sodium bisulfite, diverting at least a portion of the absorber effluent solution for regeneration with limestone, introducing limestone into the diverted absorber effluent solution to convert bisulfite to sulfite, separating by-product solids from the limestone-treated solution, and returning regenerated solution to the absorber. In accordance with the present invention, the continuous, integrated operation of the absorption and regeneration processes of a sodium-limestone double alkali system is controlled by the simplified method which comprises (a) diverting absorber effluent solution for limestone regeneration, such absorber effluent solution having a pH in the range of from 5.5–6.7;

(b) introducing into the diverted absorber effluent solution less than a stoichiometric amount of ground limestone, based on the theoretical calcium carbonate required to completely neutralize the bisulfite content of such absorber solution to sulfite, to maintain the pH of the regenerated solution at a higher pH value within the range of 6.2–7.0 and to convert from 20–70% of the solution bisulfite content to sulfite;

(c) controlling the limestone addition primarily via one parameter selected from the group of
  (i) feed forward pH measurements of the diverted absorber effluent solution, the flow of diverted absorber solution being maintained at a relatively constant rate, and
  (ii) feed forward flow measurements of the diverted absorber effluent solution, the flow of diverted absorber effluent solution being adjusted automatically to provide a relatively constant absorber effluent solution pH, with feedback pH measurements of the limestone-treated solution being used to provide trimming control of the limestone addition; and (d) compensating for process losses of sodium values by adding soda ash or sodium hydroxide at a rate sufficient to maintain the system solution active sodium content at a value within the range of 0.2–2 M, measured as the sum of the bisulfite molar concentration plus twice the sulfite molar concentration of the absorber effluent solution.

In one preferred embodiment, which is especially applicable to the treatment of high sulfur content flue gas streams, the continuous, integrated operation of the absorption and limestone regeneration processes is controlled by the method which comprises (a) diverting a relatively constant flow of absorber effluent solution for limestone regeneration, such flow selected to provide an absorber effluent solution pH in the range of from 5.5–6.7 for design gas stream flow and $SO_2$-level conditions;

(b) introducing into the diverted absorber effluent solution less than a stoichiometric amount of ground limestone, based on the theoretical calcium carbonate required to completely neutralize the bisulfite content of such absorber solution to sulfite, to maintain the pH of the regenerated solution at a higher pH value within the range of 6.2-7.0 and to convert from 20-70% of the solution bisulfite content to sulfite, such limestone addition being controlled via feed forward pH measurements of the absorber effluent solution and trimmed via feedback pH measurements of the limestone-treated solution; and (c) compensating for process losses of sodium values by adding soda ash or sodium hydroxide at a rate sufficient to maintain the system solution active sodium content at a value within the range of 0.2-2 M, measured as the sum of the bisulfite molar concentration plus twice the sulfite molar concentration of the absorber effluent solution.

In another embodiment, which is preferably employed with low sulfur content flue gas streams where high collection efficiencies are desired, the continuous, integrated operation of the absorption and limestone regeneration processes is controlled by the method which comprises (a) diverting absorber effluent solution for limestone regeneration in an amount such that the absorber effluent solution pH is maintained at a relatively constant value in the range of from 5.5-6.7, the flow rate of diverted absorber effluent solution being adjusted automatically via pH measurements of such effluent solution;

(b) introducing into the diverted absorber effluent solution less than a stoichiometric amount of ground limestone, based on the theoretical calcium carbonate required to completely neutralize the bisulfite content of such absorber solution to sulfite, to maintain the pH of the regenerated solution at a higher pH value within the range of 6.2-7.0 and to convert from 20-70% of the solution bisulfite content to sulfite, such limestone addition being controlled via feed forward flow measurements of the diverted absorber effluent solution and trimmed via feedback pH measurements of the limestone-treated solution; and (c) compensating for process losses of sodium values by adding soda ash or sodium hydroxide at a rate sufficient to maintain the system solution active sodium content at a value within the range of 0.2-2 M, measured as the sum of the bisulfite molar concentration plus twice the sulfite molar concentration of the absorber effluent solution.

BRIEF DESCRIPTION OF THE DRAWING

The drawing is a schematic flow diagram of a double alkali flue gas desulfurization system, and it illustrates a preferred embodiment of the invention in which a relatively constant flow of absorber effluent solution is diverted for regeneration, the limestone addition rate being controlled primarily via feedforward pH measurements of such diverted solution.

DETAILED DESCRIPTION

The control method of this invention is applicable to sodium-limestone double alkali flue gas desulfurization (FGD) systems that are operated on a continuous basis. Such systems are generally characterized as having two subsystems of processes, an absorption section and a regeneration section, which are operated in a continuous, closed-loop or cyclic fashion. In the absorption section, flue gas streams containing sulfur oxides, particularly sulfur dioxide ($SO_2$), are contacted with an aqueous solution containing sodium sulfite and sodium bisulfite, in an absorption tower commonly called a scrubber or absorber. Sulfur dioxide is absorbed into the absorber solution, and the principal reaction that occurs is the conversion of sodium sulfite to sodium bisulfite. Sodium sulfate may also be formed incidentally by oxidation of sodium sulfite in solution with oxygen from the flue gas.

In the regeneration section, effluent solution from the absorber is diverted for treatment with limestone (calcium carbonate) to regenerate sodium sulfite from sodium bisulfite. The regeneration reaction yields a solid byproduct, primarily calcium sulfite, but calcium sulfate may also be coprecipitated.

After separation of the byproduct solids from the limestone-treated solution, the essentially solids-free regenerated solution is returned to the absorption section to continue the absorption-regeneration cycle.

Successful, efficient operation of such a continuous, closed-loop sodium-limestone flue gas desulfurization system requires a control system which provides an amount of limestone during regeneration that correlates closely with the sulfur dioxide collected during absorption and which responds quickly to fluctuations in $SO_2$ concentration and flue gas flow rates (which affect $SO_2$ collection) normally encountered in commercial-scale operations.

The simple regeneration pH feedback systems commonly employed with lime-based regeneration procedures to adjust the lime addition (without regard to the $SO_2$ collection amount and rate) are not feasible with limestone-based regeneration, for reasons noted earlier in the Background of the Invention. Consequently, the amount and rate of $SO_2$ collected during the absorption step in a sodium-limestone FGD system must be determined precisely and accurately so that the appropriate amount of limestone can be provided during the regeneration step.

Direct determination of $SO_2$ content and volumetric flow rates of the flue gas stream is not practical in commercial-scale systems, primarily due to the large flow quantity of flue gas and the lack of reliable methodology for making such continuous measurements with accuracy.

It has been discovered, however, that an effective control strategy can be implemented for a sodium-limestone flue gas desulfurization system using only a few process solution parameter measurements, selected on the basis of material balance considerations for the combined, integrated, i.e., closed loop, absorption and regeneration operations. The control strategy not only satisfies the desired constraint that the limestone feed rate be adjusted in direct proportion to the $SO_2$ absorption rate, but also supplies limestone in a manner that assures its efficient utilization in the regeneration procedure.

In particular, measurements of the absorber effluent solution pH, the volume flow of absorber effluent solution diverted to limestone regeneration, and the level of active sodium in the absorber effluent solution provide sufficient information, when coupled with the desired regeneration solution set point pH (and chemistry), to determine sulfur dioxide collection rates and amounts. Continuous measurement of these parameters and/or knowledge of their values provide the material balance data required to estimate the sulfur dioxide collection amount and rate during absorption.

The $SO_2$ collection in the absorber correlates directly with the absorber effluent flow diverted to regeneration and the change in bisulfite concentration effected in the absorber effluent solution during regeneration of such solution, which thus provide sufficient information to determine the limestone feed requirements during regeneration. The pH's of the absorber effluent solution and of the regenerated solution are proportional to the approximate relative amounts of sodium sulfite and sodium bisulfite in such solutions. The active sodium concentration, furthermore, can be combined with the pH data to calculate the amounts of sodium sulfite and sodium bisulfite present in such solutions.

The process control method of this invention is based on the finding that, since active sodium concentration may be deemed relatively constant (for reasons stated below), fixing either the absorber effluent solution pH or the flow of absorber effluent solution diverted for regeneration at a constant value will allow the remaining variable to be used as a primary control parameter. This single control parameter is indicative of, and correlates directly with, the level (and variation) of the amount of sulfur dioxide collected during absorption and present in the absorber effluent solution. The single parameter control strategy not only simplifies the overall control of a sodium-limestone double alkali FGD system but also ensures the system's reliability, stability and efficiency.

In one process control mode of operation, the absorber effluent solution pH is maintained at a relatively constant value within a suitable range such that sulfur dioxide collection efficiency requirements in the absorber are met over the normal, anticipated range of operating conditions for the FGD system. In this control mode, the flow of absorber effluent solution diverted to the regeneration procedure, and the corresponding return flow of regenerated solution back to the absorber section, are allowed to vary, while the inventory of solution in the absorption section is nevertheless maintained at a relatively constant level.

This control procedure, i.e., variable flow rate-fixed absorber effluent solution pH set point, is most appropriate for flue gas desulfurization systems in which there is a relatively low $SO_2$ content in the gas stream. In such cases, outlet vapor pressure (or $SO_2$) in the absorber effluent solution must be controlled precisely, and a constant pH in the absorber effluent solution facilitates such an objective.

In a second control mode of this invention, the flow of the absorber effluent solution diverted for regeneration is maintained at a relatively constant value, usually at a design maximum flow, and the pH of the absorber effluent solution is allowed to vary. The absorber effluent solution pH is permitted to fluctuate within a range of pH values above a predetermined minimum pH value that provides for efficient sulfur dioxide absorption under all anticipated changes in the volume (load) and $SO_2$ content of the flue gas stream being treated.

The information derived from the measurement of the variable (control) parameter, either pH or flow rate of the diverted absorber effluent solution, coupled with the (relatively constant) values that have been established or determined for the remaining parameters, is then employed as a control signal to adjust the amount of limestone required to effect the desired degree of bisulfite-to-sulfite regeneration. The feed forward control signal is simply linked to a flow control device that regulates the limestone addition rate or quantity in the regeneration procedure.

This control system for controlling the limestone addition avoids the difficulties, from a control standpoint, of the low reactivity of limestone with bisulfite and the consequent long reaction residence times typically required for limestone regeneration. This contrasts with lime-based regeneration systems which are characterized by high lime-bisulfite reactivities and short residence times that permit the use of simple feedback controls based on the regeneration solution pH, as noted previously in the Background of the Invention.

When the limestone addition during regeneration is carried out in this controlled manner to maintain the regenerated solution pH at a relatively fixed desired value, the absorption process will be operated at consistently high efficiency since the composition of regenerated absorber solution being returned to the absorber remains fairly constant.

As mentioned above, it has been discovered that the active sodium value of the absorption solution may be eliminated, from a process control standpoint, as a useful control variable. The active sodium concentration in commerical-scale sodium-limestone FGD systems will remain relatively constant over fairly long periods of time (8-24 hours), because of the large volume of solution in the system and because of the relatively high solution concentrations typically employed.

The "active sodium" concentration of the absorber effluent solution is a relative measure of its absorptive capacity and is conveniently defined as, and measured by, the sum of the bisulfite molar concentration plus twice the sulfite molar concentration in the absorber effluent solution. This presumes that any sodium carbonate, sodium hydroxide and/or sodium bicarbonate from alkali makeup is present in small concentrations, i.e., typically much less than 0.1 M, since such alkali would have reacted during absorption with sulfur dioxide to form sulfite/bisulfite in the absorber effluent solution.

When compared to the other two parameters, i.e., absorber effluent solution pH and flow rate of the diverted solution, the active sodium concentration may therefore be deemed essentially constant. Adjustments for sodium losses in normal FGD process operations, such as drag out on calcium solids, are thus needed only periodically, e.g., once or twice daily, to adjust the active sodium level to within the desired operating values. In lieu of manual or semi-automatic adjustments to the active sodium concentration, the active sodium concentration of the circulating solution could be continuously monitored and adjustments to the active sodium level made automatically through the addition of makeup alkali but this is generally unnecessary.

The concentration of active sodium, measured as the molar concentration of (sodium) bisulfite plus twice the molar concentration (sodium) sulfite in the absorption effluent solution, should be maintained at a set-point value or desired level within the range of from 0.2 M to 2 M, preferably from 0.5 M to 1.5 M. Maintenance of the active sodium concentration within these ranges is advantageous for minimizing the consumption of sodium in the continuous, cyclic operation of the FGD system invention. Higher active sodium concentrations ordinarily result in unsatisfactorily high sodium consumption due to solution losses in the calcium sulfite byproduct that is discarded.

The process control strategy of this invention is employed with sodium-limestone FGD systems in which the control parameters are maintained within certain specific ranges in order to achieve both high sulfur dioxide collection efficiency and high limestone utilization.

The pH of the absorption effluent solution, i.e., solution withdrawn from the absorber after it has been contacted with the $SO_2$-containing flue gas, should be maintained within a suitable range consistent with the absorber design, generally selected from values within 5.5 to 6.7, preferably from 6.0 to 6.3. Higher pH's than 6.7 are undesirable since only limited bisulfite conversion to sulfite can be accomplished during regeneration under such conditions. Regeneration at excessively high absorber effluent pH values requires that inefficiently large volumes of solution be diverted for treatment in regeneration to effect the degree of bisulfite conversion required.

Absorber effluent solution pH values that are below the lower specified limits are best avoided since such acidic solutions may decrease or limit desulfurization ($SO_2$ collection) efficiencies in the absorber.

It should be understood that multiple absorbers or absorber trains may be used in some complex FGD systems, with the individual absorber effluent streams each having unique pH values and flow rates. Typically, such absorber effluent streams are combined prior to their being regenerated. In such situations, the pH of the combined effluent streams is the proper measurement point for "absorber effluent solution pH" referred to in the specific pH ranges stated above, since this value best reflects the total $SO_2$ collection by a multiple absorber system.

Likewise, it should be understood that measurement of the flow rate for multiple absorber systems should preferably be taken at the same point as the pH. Furthermore, the measurement or control of the absorber effluent flow rate may be accomplished directly or indirectly. Indirect measurement or control of the absorber effluent flow rate may be accomplished by measuring or controlling the regenerated return liquid flow rate. This is feasible because the regeneration operation is operated continuously and the absorber effluent solution flow rate plus evaporative loss rate in the absorber (typically relatively constant at least than 10% of the total absorber feed) is equivalent to the regenerated solution flow rate.

The limestone addition during regeneration is desirably adjusted such that the regeneration set point pH value is within the range of 6.2 to 7.0. It should be apparent that during regeneration, the pH of the absorber effluent solution is raised to a higher pH value than that of the absorber effluent solution, within the pH range desired for regenerated absorption solution.

The pH of the regenerated absorption solution should be maintained at a value within from the range of from 6.2 to 7.0, preferably from 6.4 to 6.8. The higher pH values within these ranges are preferred because they promote efficient absorption of sulfur dioxide in the absorber. Regeneration pH values in excess of 7.0 are detrimental to limestone utilization efficiency and are therefore to be avoided. Regeneration pH values below about 6.2–6.4 are also undesirable because of their possible adverse effect on $SO_2$ collection efficiency in the absorber.

When the regenerated solution pH is maintained within the desired range of from 6.2 to 7.0, not only does this ensure high limestone utilization during regeneration of sulfite from bisulfite but also allows this regenerated absorber solution, having a relatively moderate pH of no more than 7, to be introduced directly to the top of the absorber for immediate contact with the $SO_2$-containing flue gas stream.

The regenerated solution pH in the control method of this invention is used as a secondary control variable to provide feedback trim for adjusting the limestone feed rate. Such feedback trimming control provides a more precise adjustment of the limestone feed rate as may be required due to variation of limestone reactivity or purity, slurry density changes, and the like.

The use of regenerated solution pH as a control feedback trim for adjusting the limestone feed rate is feasible in the control method of this invention for one primary reason: The amount of ground limestone introduced into the absorption effluent solution diverted for regeneration is significantly less than stoichiometric, based on the theoretical amount of calcium carbonate required to completely neturalize the bisulfite content of such absorption solution to sulfite.

The amount of ground limestone employed during regeneration is preferably no more than about 85% of stoichiometric, most preferably from 20 to 80% of stoichiometric. The stoichiometric percentage of limestone, it should be noted, corresponds to the percentage of bisulfite neutralized to sulfite, if it is assumed that limestone utilization is substantially complete.

A further requirement for the regeneration step is therefore that the amount of limestone added be not more than the amount sufficient to convert, or neutralize, from 20–70% of the absorber effluent bisulfite content to sulfite.

The sodium bisulfite content of the absorber effluent solution is only partically neutralized to sulfite during regeneration, the percentage of bisulfite converted to sulfite being maintained within the range of 20–70%, preferably 20–60%. These precentages may alternatively be expressed as fractions, being 0.2–0.7 and 0.2–0.6, respectively.

Within the preferred bisulfite conversion ranges, limestone utilization, i.e., percentage of calcium carbonate in limestone that is reacted, is high, generally 85–90% or more.

Bisulfite conversion percentages higher than about 60–70% usually lead to poor limestone utilization efficiency and are therefore undesirable. Percentages lower than 20% are also undesirable since the amount of absorption effluent solution that must be diverted for regeneration become uneconomically large and/or the active sodium concentration must be adjusted upwards to undesirably high levels.

Operation of the regeneration process with the limestone addition being controlled to provide less than a stoichiometric amount of limestone provides certain unexpected advantages from a process control standpoint. Neither limestone utilization nor $SO_2$ collection efficiency are significantly affected by slight deviations (particularly overfeeding) in the limestone feed rate from the desired value over a short period of time, within control response time. This is due not only to the substoichiometry of limestone employed during regeneration but also to the buffering nature of the absorption solution when the control parameters are maintained within the preferred operating ranges.

Because less than a stoichiometric amount of limestone is utilized and less than all of the bisulfite is neutralized to sulfite, slight changes in the regenerated solution pH away from the desired set point pH value can readily be corrected via feedback control adjustments in the limestone addition rate. By contrast, if a stoichiometric amount or excess of limestone were to be employed during regeneration, carbonate and bicarbonate ions that would be formed would likely interfere with the correlation of pH measurements with the relative concentration of bisulfite and sulfite and preclude the effective use of regeneration pH as a control parameter in method of this invention.

The control procedures described above for limestone regeneration in double alkali FGD systems yield distinct advantages, especially when compared with the operation and process control of lime-based double alkali systems.

The limestone double alkali regeneration, with its pH being controlled to not more than 7, has the advantage of maintaining good overall process control even during turndown periods. Process turndown periods result when the normal volume of $SO_2$-containing flue gas decreases (e.g., at boiler operations of half capacity) or when the $SO_2$ content of the gas stream changes (due to sulfur variations in the fuel). During turndown periods $SO_2$ absorption from the gas stream is minimal and the absorber solution pH therefore tends to increase (if not otherwise controlled), approaching the pH of the regenerated solution being returned to the absorber.

In limestone double alkali systems, particularly those using the constant flow control mode, this imposes no additional control requirements, since the absorber pH may be as high as 7 without adverse effect on its absorption characteristics. This situation contrasts with conventional lime double alkali systems, where the high regeneration solution pH (8-10) requires that the control design include a provision for throttling back regenerated solution flow during turndown periods to prevent the overall absorber solution pH from becoming too alkaline.

Another advantage of the present control system for sodium-limestone FGD systems is that use of absorber effluent solution pH as a primary control parameter involves pH measurements of a solution, not a liquid-solid mixture. This provides for inherently more accurate pH measurements, as compared with slurry pH measurements, and avoids the electrode performance being adversely affected by solids coating.

EXAMPLE

The Example illustrates the application of a preferred embodiment of the present invention to a sodium-limestone flue gas desulfurization system that treats $SO_2$-containing combustion gases from a large boiler utilizing high sulfur coal. The double alkali flue gas desulfurization system is operated continuously, and normal steady state conditions are assumed for purposes of the Example.

In this preferred embodiment, a relatively constant flow of absorber effluent solution is diverted for regeneration, the limestone addition being controlled primarily via feed forward pH measurement signals from such diverted solution. The drawing illustrates a schematic flow diagram of the double alkali flue gas desulfurization system, as controlled in this preferred embodiment; reference numerals in the drawing are included in the process description which follows.

In the absorption section, flue gas 1 containing about 2800 ppmv $SO_2$ from the boiler is introduced at a rate of about 172,000 acfm (81 m³/sec) and at a temperature of 370° F. (188° C.) into a countercurrent flow spray tower absorber 2. In the absorber 2, sulfur dioxide is absorbed into aqeuous solution containing both sodium sulfite and sodium bisulfite, and the treated flue gas 3 which exits from the absorber has substantially all (in excess of 90%) sulfur dioxide removed. The treated flue gas 3 exits at a rate of about 139,000 acfm (66 m³/sec) and at a temperature of 138° F. (59° C.). Before being vented, the treated flue gas stream 3 is passed through a mist eliminator (not shown) to recover entrained absorber solution from the gas stream.

Regenerated absorber solution 4 is introduced continuously at the top stage of the absorber tower, by pumping, at a relatively constant, average flow rate of about 830 gpm (52 liters/sec). The regenerated absorber solution 4 has a pH of about 6.7.

Aqueous solution which accumulates in the absorber tower sump is removed by pumping and split into two streams, the first stream 5 being recycled to the absorber tower 2 at a rate of about 2700 gpm (170 liters/sec).

The remaining portion of absorber solution removed from the absorber tower sump is diverted as stream 6 and subjected to regeneration with limestone in the regeneration section. Effluent solution 6 is diverted in an amount which maintains an essentially constant inventory of solution in the absorber sump. This is preferably accomplished by linking a level detector-controller 7 in the absorber sump to a valve in diverted stream 6, to thereby provide a relatively constant flow of solution diverted for regeneration. Evaporative losses in the absorber, from water vapor being lost with the exiting flue gas, are compensated for automatically during regeneration, by the addition of make-up water (described below).

The pH of the absorber solution removed from the absorber (for recirculation and for regeneration) is about 6.2 at full load. It should be understood that this pH will increase, within the range of about 6.2 to 6.7, when load conditions decrease, as during dynamic turndown when a reduced volume of flue gas or a lesser $SO_2$ content is being treated. This pH increase occurs because the effluent solution 6 is diverted for regeneration at a relatively constant flow rate, and the returning regenerated absorber solution at a higher pH is not being utilized at its full capacity for absorbing $SO_2$.

The pH of the absorber effluent solution stream 6 is continuously monitored, via monitor-controlled 8, and these measurements are employed as a feedforward control signal for the limestone addition rate, as described below. In the control mode described for this Example, the pH of the absorber effluent solution is allowed to fluctuate, and it is not maintained at a fixed or set value.

The diverted absorber solution 6, rich in sodium bisulfite, is regenerated with limestone 9 in a multi-stage reactor. The regeneration reactor has four stages 10A, 10B, 10C, 10D in series and is a cascade type, in which overflow slurry from the first stage 10A is introduced by gravity into the second stage 10B, and so forth for the remaining stages C and D. There is no external level controller required for any of the individual reactor stages. Each of the four stages is equipped with an agitator to assure good mixing.

Limestone for use in this regeneration is prepared by wet ball milling of limestone lumps to recover ground limestone that is substantially all less than 325 (45 μm)

Sieve in size and typically analyzes as 90% by weight $CaCO_3$. The ground limestone 9 is introduced as an aqueous slurry, containing about 30–40% by weight solids, and is apportioned by manual adjustment of valves 11 between the initial two reactor stages 10A, 10B to minimize nucleation of calcium sulfite and thus produce a good quality, readily-filterable cake.

The total addition rate of the limestone slurry 9 is automatically adjusted by feedforward control signals from the monitor-controller 8 which utilizes continuous pH measurements of the absorber effluent solution 6. As the absorber effluent solution bisulfite concentration increases and lowers the pH (solution becomes more acidic), as when the sulfur dioxide concentration in the flue gas increases and more $SO_2$ is absorbed, the monitor-controlled 8 provides for an increased addition of limestone to maintain the regeneration pH of the overflow solution from the last reactor stage 10D at an approximately constant value.

The limestone slurry feed rate is adjusted further, or trimmed, based on pH measurements of the overflow slurry 12 from the final reactor stage 10D. These continuous pH measurements are used to provide trimming adjustments for monitor-controller 8 to compensate for variations in limestone slurry density, limestone reactivity and purity, and the like. In this manner, precise control of the regeneration pH is achieved, the desired pH being maintained at a relatively constant value of 6.7.

The ground limestone slurry 9, containing 35 wt % solids, is introduced at an overall rate of about 14,100 lb/hr (6400 kg/hr).

In addition to the limestone, a portion of calcium sulfite solids 13, is recycled via pumping to the first reactor stage 10A to serve as seed crystals. This preferred seeding procedure promotes the growth of large calcium sulfite crystals with good settling characteristics. The proportion of calcium sulfite solids recycled to the first reactor stage 10A for seeding purposes is adjusted so that the solids concentration in the last stage 10D is maintained below about 1 to 2% by weight. This is ordinarily a manual adjustment and does not entail automatic control procedures.

Residence time of the diverted absorber effluent solution 6 in the four reactor stages 10A–10D is about two hours. The feedforward pH control system for controlling the primary addition of limestone described above provides good control of the degree of regeneration, despite this long residence time and despite the relatively low reactivity of limestone with bisulfite.

The slurry overflow 12 from the last reactor stage 10D is passed by gravity flow to a thickener 14 for liquid-solid separation. The thickener 14 is operated such that the underflow is a concentrated slurry containing about 15–35 wt % solids, usually 20 wt % solids. No automatic controls are required for the thickener tank.

Most of the thickener slurry underflow 15 is passed to a rotary vacuum filter 16, a portion 13 of the concentrated slurry underflow being pumped, as mentioned previously, to the first stage 10A of the limestone reactor. The filtration of the thickener slurry underflow 15 produces a dewatered filter cake 17 and a mother liquor 18. The filter cake 17, which is about 45–55% by weight solids that are predominantly calcium sulfite, is discarded. The mother liquor 18, which also contains any wash water (not shown in drawing) used to wash the filter cake, is returned to the thickener 14 for further clarification.

Overflow solution 19 from the thickener 14 is transferred to a surge or hold tank 20 before it is returned to the absorber, by pumping. As was described earlier, the large volumes of solution in commercial scale double alkali systems result in relatively gradual changes in the solution sodium level, i.e., active sodium concentration. Consequently, adjustments to the sodium level to compensate for sodium losses, e.g., in the filter cake, are preferably performed once or twice per day based on sample analyses of the recirculating solution. Based on such analyses, the thickener overflow solution in the surge tank 20 is mixed with soda ash 21 ($Na_2CO_3$) or caustic soda (NaOH) and make-up water 22 to compensate for depleted sodium values and for evaporative losses of water in the absorber effluent gas stream. The active sodium in the regenerated absorber solution is preferably maintained through such periodic (once or twice per day) adjustments, at a concentration of about 0.85 M. The active sodium adjustments are carried out manually based on current analyses of the system solution, and may be done batchwise or introduced continuously, with such continuous flow being adjusted once or twice per day based on solution analyses. Make-up water addition is preferably controlled automatically via a level monitor-controller 23 in the surge tank 20.

Aqueous solution 4 from the surge tank is a sodium sulfite-rich solution whose pH is maintained at about 6.7 via the automatic controls on the total limestone feed addition 9 to reactor stages 10A and 10B described above. This solution 4 is returned to the absorber 2 by pumping at a relatively constant average flow rate of 830 gpm (52 liters/sec).

The decrease in bisulfite concentration, after the absorber effluent solution 6 has been treated with limestone and is ready for return to the absorber as regenerated solution 4, is about 0.22 M. The percentage of sodium bisulfite in the absorber effluent solution that is converted to sulfite by the limestone treatment is about 50%.

The limestone utilization in the process as described above is in excess of 90%, thus providing for a highly efficient operation with only minimal process controls being required to such satisfactory operation of the absorption and regeneration sections.

We claim:

1. In a sodium-limestone double alkali process for the continuous desulfurization of flue gas, having the steps of absorbing sulfur dioxide from a $SO_2$-containing gas stream in an absorber with an aqueous solution of sodium sulfite and sodium bisulfite, diverting at least a portion of the absorber effluent solution for regeneration with limestone, introducing limestone into the diverted absorber effluent solution to convert bisulfite to sulfite, separating byproduct solids from the limestone-treated solution, and returning regenerated solution to the absorber, the improvement for controlling the continuous, integrated operation of the absorption and regeneration which comprises
   (a) diverting absorber effluent solution for limestone regeneration, such absorber effluent solution having a pH in the range of from 5.5–6.7;
   (b) introducing into the diverted absorber effluent solution less than a stoichiometric amount of ground limestone, based on the theoretical calcium carbonate required to completely neutralize the bisulfite content of such absorber solution to sulfite, to maintain the pH of the regenerated solution at a higher pH value within the range of 6.2–7.0 and to convert from 20–70% of the solution bisulfite content to sulfite;

(c) controlling the limestone addition primarily via either
  (i) feed forward pH measurements of the diverted absorber effluent solution, the flow of diverted absorber solution being maintained at a relatively constant rate, or
  (ii) feed forward flow measurements of the diverted absorber effluent solution, the flow of diverted absorber effluent solution being adjusted automatically to provide a relatively constant absorber effluent solution, pH, with feedback pH measurements of the limestone-treated solution being used to provide trimming control of the limestone addition; and (d) compensating for process losses of sodium values by adding soda ash or sodium hydroxide at a rate sufficient to maintain the system solution active sodium content at a value within the range of 0.2–2 M, measured as the sum of the bisulfite molar concentration plus twice the sulfite molar concentration of the absorber effluent solution.

2. In a sodium-limestone double alkali process for the continuous desulfurization of flue gas, having the steps of absorbing sulfur dioxide from a $SO_2$-containing gas stream in an absorber with an aqueous solution of sodium sulfite and sodium bisulfite, diverting at least a portion of the absorber effluent solution for regeneration with limestone, introducing limestone into the diverted absorber effluent solution to convert bisulfite to sulfite, separating byproduct solids from the limestone-treated solution, and returning regenerated solution to the absorber, the improvement for controlling the continuous, integrated operation of the absorption and regeneration which comprises (a) diverting a relatively constant flow of absorber effluent solution for limestone regeneration, such flow selected to provide an absorber effluent solution pH in the range of from 5.5–6.7 for design gas stream flow and $SO_2$-level conditions;

(b) introducing into the diverted absorber effluent solution less than a stoichiometric amount of ground limestone, based on the theoretical calcium carbonate required to completely neutralize the bisulfite content of such absorber solution to sulfite, to maintain the pH of the regenerated solution at a higher pH value within the range of 6.2–7.0 and to convert from 20–70% of the solution bisulfite content to sulfite, such limestone addition being controlled via feed forward pH measurements of the absorber effluent solution and trimmed via feedback pH measurements of the limestone-treated solution; and (c) compensating for process losses of sodium values by adding soda ash or sodium hydroxide at a rate sufficient to maintain the system solution active sodium content at a value within the range of 0.2–2 M, measured as the sum of the bisulfite molar concentration plus twice the sulfite molar concentration of the absorber effluent solution.

3. In a sodium-limestone double alkali process for the continuous desulfurization of flue gas, having the steps of absorbing sulfur dioxide from a $SO_2$-containing gas stream in an absorber with an aqueous solution of sodium sulfite and sodium bisulfite, diverting at least a portion of the absorber effluent solution for regeneration with limestone, introducing limestone into the diverted absorber effluent solution to convert bisulfite to sulfite, separating byproduct solids from the limestone-treated solution, and returning regenerated solution to the absorber, the improvement for controlling the continuous, integrated operation of the absorption and regeneration which comprises (a) diverting absorber effluent solution for limestone regeneration in an amount such that the absorber effluent solution pH is maintained at a relatively constant value in the range of from 5.5–6.7, the flow rate of diverted absorber effluent solution being adjusted automatically via pH measurements of such effluent solution;

(b) introducing into the diverted absorber effluent solution less than a stoichiometric amount of ground limestone, based on the theoretical calcium carbonate required to completely neutralize the bisulfite content of such absorber solution to sulfite, to maintain the pH of the regenerated solution at a higher pH value within the range of 6.2–7.0 and to convert from 20–70% of the solution bisulfite content to sulfite, such limestone addition being controlled via feed forward flow measurements of the diverted absorber effluent solution and trimmed via feedback pH measurements of the limestone-treated solution; and (c) compensating for process losses of sodium values by adding soda ash or sodium hydroxide at a rate sufficient to maintain the system solution active sodium content at a value within the range of 0.2–2 M, measured as the sum of the bisulfite molar concentration plus twice the sulfite molar concentration of the absorber effluent solution.

4. The process of claim 1, 2 or 3 wherein the absorber effluent solution pH is within the range of 6.0–6.3.

5. The process of claim 1, 2 or 3 wherein the regenerated solution pH is within the range of 6.4–6.8.

6. The process of claim 1, 2 or 3 wherein from 20–60% of the solution bisulfite content is converted to sulfite during regeneration.

7. The process of claim 1, 2 or 3 wherein the active sodium content is maintained at a value within the range of from 0.5–1.5 M.

8. The process of claim 1, 2 or 3 wherein evaporative losses of water during the absorption process are compensated for by the addition of make-up water during the regeneration.

* * * * *